(12) United States Patent
Shih

(10) Patent No.: US 6,646,870 B2
(45) Date of Patent: Nov. 11, 2003

(54) MODULARIZED COMPONENT MOUNTING STRUCTURE

(76) Inventor: Shoei-Yuan Shih, No.8, Lane 85, Hsing-I Rd., Pei-Tou Dist., Taipei (TW)

( * ) Notice: Subject to any disclaimer, the term of this patent is extended or adjusted under 35 U.S.C. 154(b) by 12 days.

(21) Appl. No.: 10/014,545

(22) Filed: Dec. 14, 2001

(65) Prior Publication Data

US 2002/0044418 A1 Apr. 18, 2002

(51) Int. Cl.⁷ .................................................. G06F 1/16
(52) U.S. Cl. ........................ 361/685; 361/600; 361/683
(58) Field of Search ............................... 361/600, 679, 361/683–686

(56) References Cited

U.S. PATENT DOCUMENTS 5,566,049 A * 10/1996 Nguyen ...................... 361/685
6,130,817 A * 10/2000 Flotho et al. ............... 361/685

* cited by examiner

*Primary Examiner*—Darren Schuberg
*Assistant Examiner*—Yean-Hsi Chang
(74) *Attorney, Agent, or Firm*—Birch, Stewart, Kolasch & Birch, LLP

(57) ABSTRACT

An improved modularized component mounting structure includes at least one mounting structure which has a first fasten section and a second fasten section. The first fasten section has a fasten opening. The second fasten section has a pair of corresponding first coupling apertures and a pair of corresponding second coupling apertures located between the first coupling apertures. There is a casing which has a support section with a plurality of jutting struts located on a surface thereof. The mounting structure may be fastened to a component for mounting the component in the interior of the casing.

8 Claims, 7 Drawing Sheets

US 6,646,870 B2

MODULARIZED COMPONENT MOUNTING STRUCTURE

FIELD OF THE INVENTION

The present invention relates to an improved modularized component mounting structure for fastening to components (floppy disk drives or optical disk drives) then mounting the components inside a casing.

BACKGROUND OF THE INVENTION

All known industrial computer processors or servers include a plurality of retrievable hard disk drives. In the event of malfunction or damage incurred to a hard disk drive and cannot read or write data during operation of the processors or servers, the processors or servers will automatically switch to another hard disk drive to prevent the processors or servers from interruption or causing loss.

The industrial computer processors or servers have little space left after the retrievable hard disk drives have been installed. The space left usually cannot be used for installing floppy disk drives or optical disk drives. When users want to utilize that space for installing the floppy disk drives or optical disk drives, a mounting structure (such as frames) must be fastened to the floppy disk drives or optical disk drives for mounting purpose. As the floppy disk drives or optical disk drives have many different specifications, there are also many different specifications for the mounting structure. As a result, there are compatibility problems and might cause the floppy disk drives or optical disk drives not installable, or different specifications of mounting structure have to be chosen and that could create a lot of trouble and inconvenience to users.

SUMMARY OF THE INVENTION

The primary object of the invention is to resolve the aforesaid disadvantages. The invention aims to provide an improved modularized component mounting structure that is adaptable to floppy disk drives or optical disk drives for users to easily install the floppy disk drives or optical disk drives inside the casing.

Another object of the invention is to provide an improved modularized component mounting structure that is adaptable to different specifications made by various floppy disk drive or optical disk drive producers such that two mounting structures may be fastened to a floppy disk drive or an optical disk drive at the same direction or different directions.

To attain the foregoing objects, the mounting structure of the invention includes at least one mounting structure. The mounting structure has a first fasten section and a second fasten section. The first fasten section has a fasten opening. The second fasten section has two corresponding first coupling apertures and two corresponding second coupling apertures located between the first coupling apertures. The casing has a support section with a plurality of jutting struts located on the surface thereof. The mounting structure thus constructed can be used to fasten components and install the components inside the casing.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
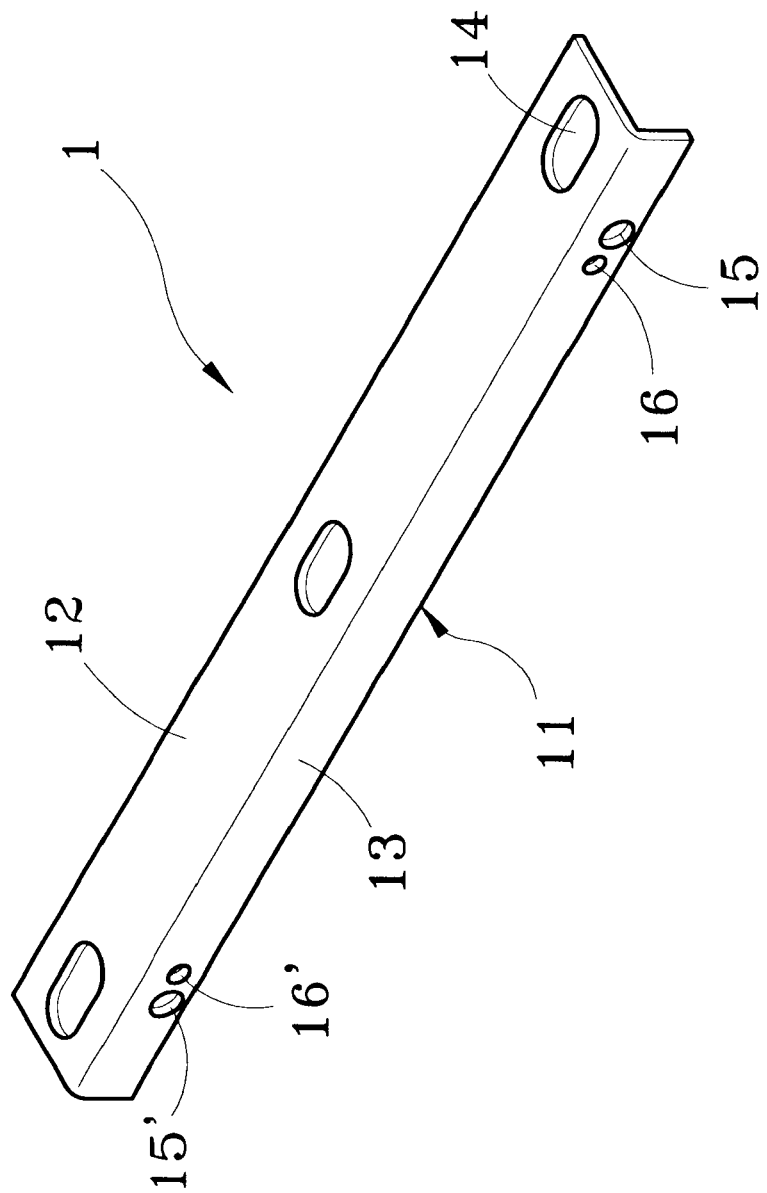
FIG. 1 is a perspective view of a mounting structure of the invention.

Referring to FIG. 1, the mounting structure 1 of the invention is formed by a plate and has a bend section 11 which has two free ends extending to form a first fasten section 12 and a second fasten section 13 which may have same or different widths. The first fasten section 12 has at least one fasten opening 14 which has a narrow slot interior for adjusting use. When the mounting structure 1 is used for installing a floppy disk drive (not shown in the drawing) or a CD-ROM drive (also not shown in the drawing) inside the casing 2, the fastening opening 14 allows the floppy disk drive or CD-ROM drive to adjust to a location desired then mounts to the interior of the casing 2. On the second fasten section 13, there are a pair of spaced first coupling apertures 15, 15' for fastening the floppy disk drive, and a pair of spaced second coupling apertures 16, 16' located between the first coupling apertures 15, 15' for fastening the CD-ROM drive.

Figure 2:
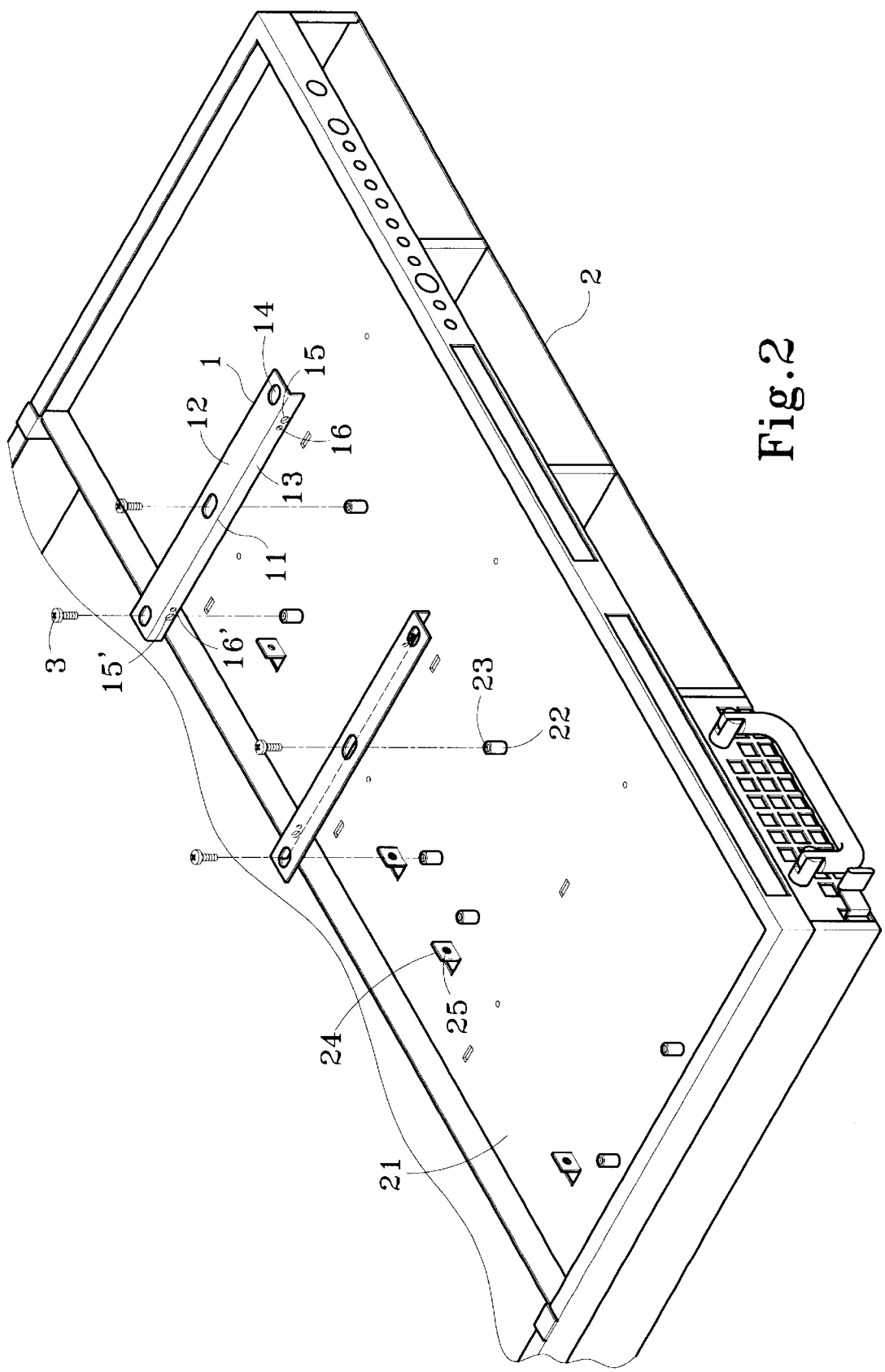
FIG. 2 is a schematic view of structural relationship of the invention and a casing.

Referring to FIG. 2, after the floppy disk drive or CD-ROM drive is fastened to the second fasten section 13 of the mounting means 1, the floppy disk drive or CD-ROM drive may be mounted in the interior of the casing 2.

Inside the casing 2, there is a support section (or partition) 21 that has a surface with a plurality of jutting struts 22 located thereon. Each of the jutting struts 22 has internal screw threads 23 formed therein to engage with a fasten element 3 which may run through the fasten opening 14 of the first fasten section 12 for fastening the mounting structure 1 securely to the jutting struts 22.

The support section 21 may further has corresponding jutting connection plates 24 located thereon. Each of the connection plates 24 has an aperture 25 to engage with a fasten element (not shown in the drawings) for fastening a circuit board (not shown in the drawings) or an interface circuit board. When the floppy disk drive or CD-ROM drive is mounted in the interior of the casing 2, the contact legs of the floppy disk drive or CD-ROM drive may be connected to the circuit board or interface circuit board for data signal transmission of the floppy disk drive or CD-ROM drive.

Figure 3:
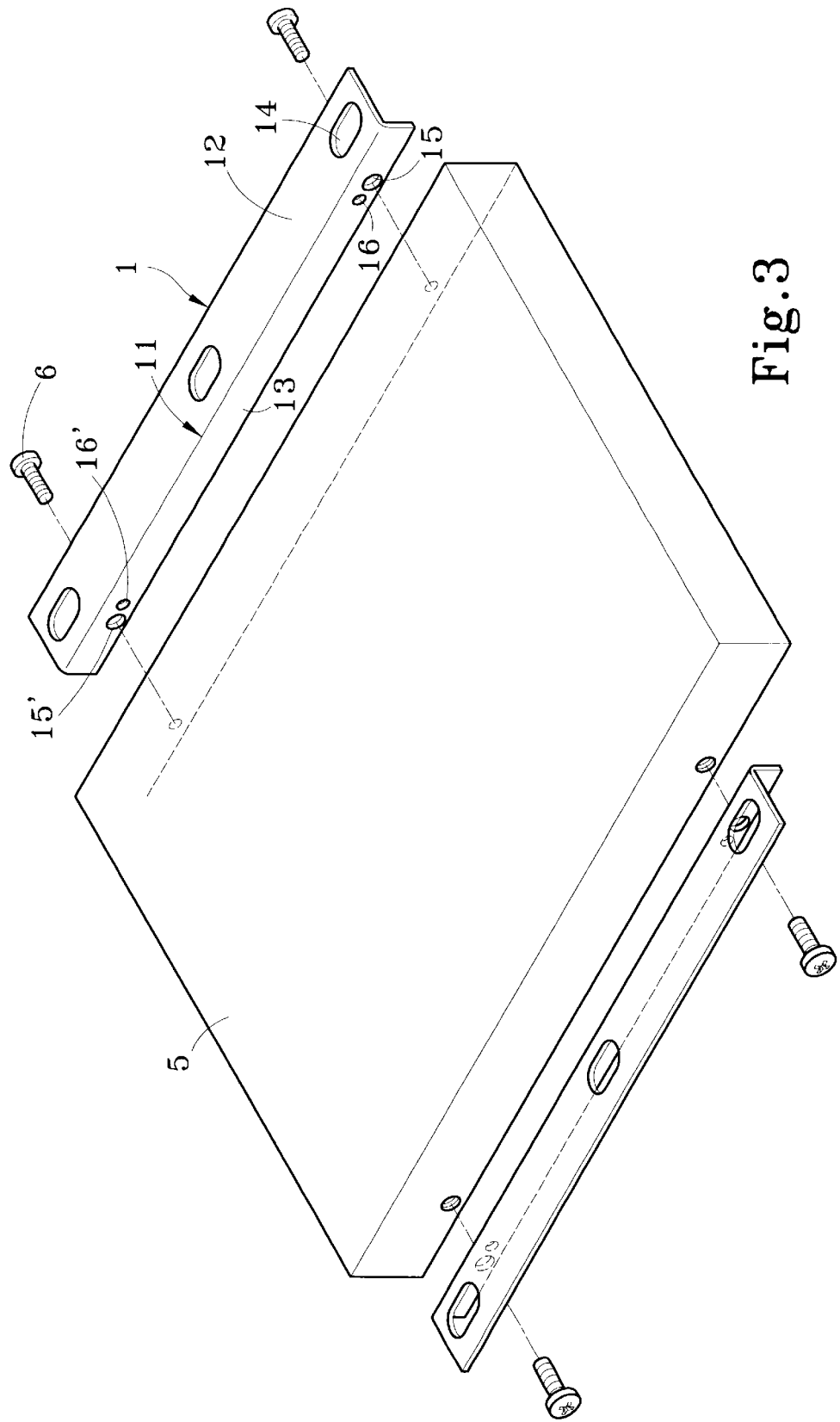
FIG. 3 is a perspective view of the invention in use.
Figure 4:
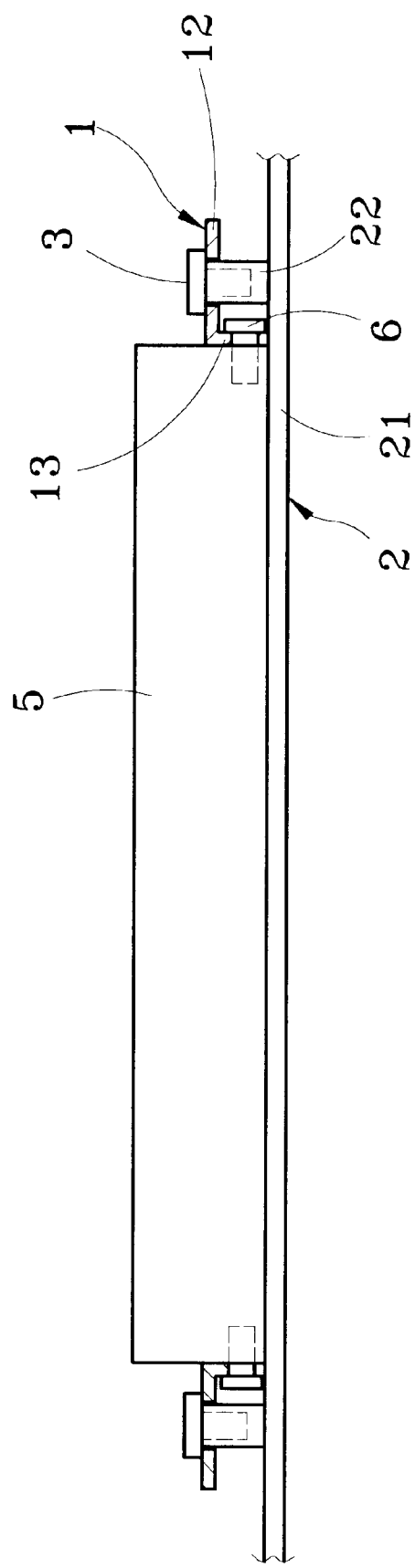
FIG. 4 is a front view of the invention in use according to FIG. 3.

Referring to FIGS. 3 and 4, when in use, the mounting structure 1 is used to fasten the floppy disk drive 5 in the interior of the casing 2. This may be achieved by engaging a fasten element 6 through the first coupling apertures 15, 15' to fasten the floppy disk drive 5, then engage the fasten element 3 through the fasten opening 14 of the first fasten section 12 to the strut 22 for anchoring the floppy disk drive 5 on the casing 2.

During fastening the mounting structure 1 to the strut 22 of the casing 2, the fasten opening 14 may be used to adjust any deviation of installation location of the floppy disk drive 5, then fasten the fasten element 3 tightly to install the floppy disk drive 5 securely in the interior of the casing 2.

Figure 5:
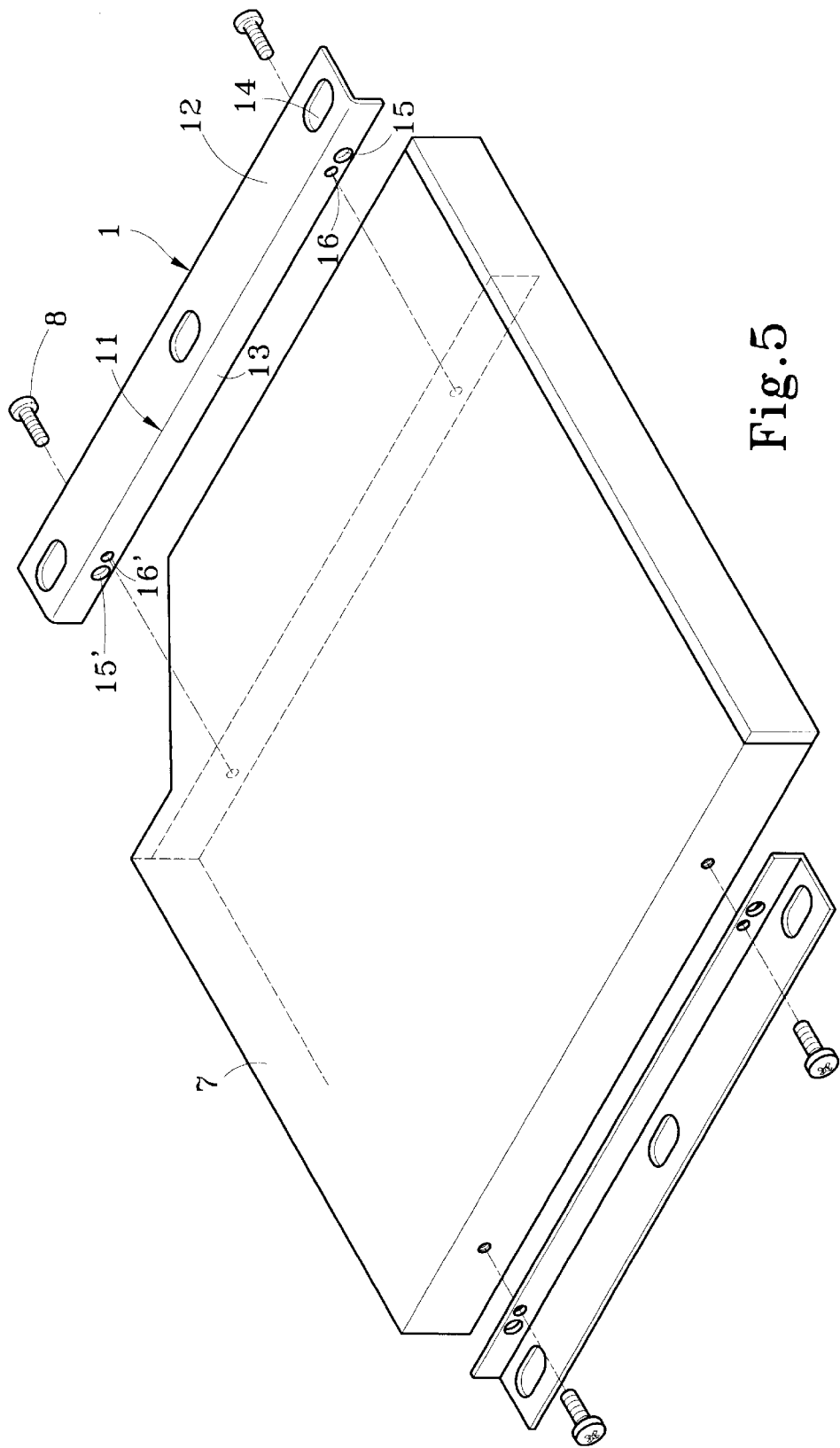
FIG. 5 is another perspective view of the invention in use.
Figure 6:
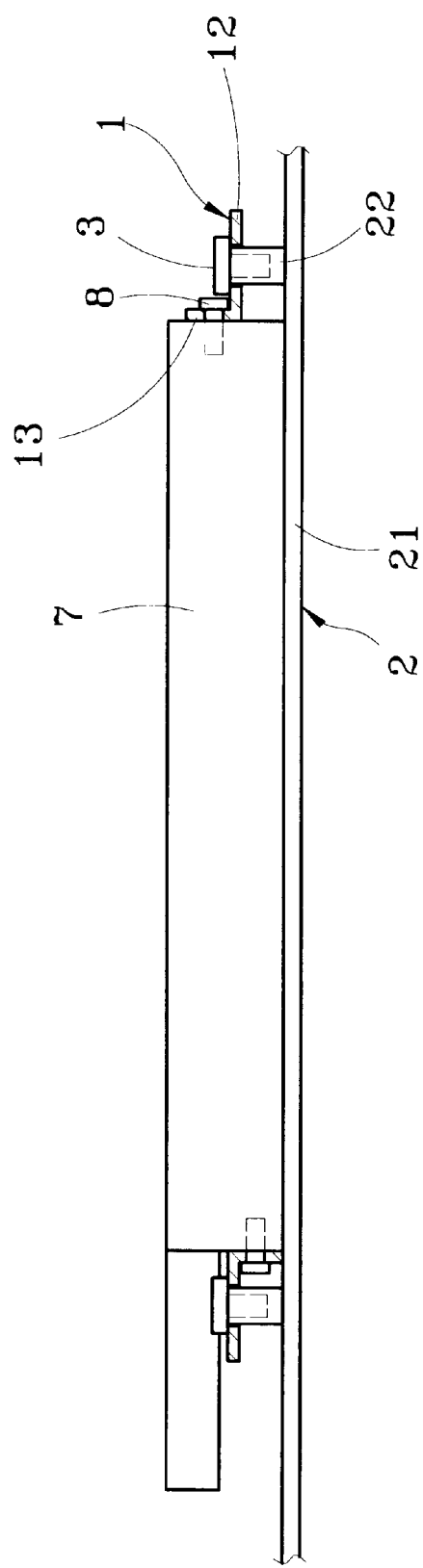
FIG. 6 is a front view of the invention in use according to FIG. 5.

FIGS. 5 and 6 show another utilization condition of the invention for using the mounting structure 1 to fasten an optical disk drive 7 in the interior of the casing 2. A fasten element 8 is used to engage with the second coupling apertures 16, 16' of the second fasten section 13 for mounting the optical disk drive 7 inside the casing 2. Then engage the fasten element 3 through the fasten opening 14 of the first fasten section 12 to the strut 22 for anchoring the optical disk drive 7 on the casing 2.

During fastening the mounting structure 1 to the strut 22 of the casing 2, the fasten opening 14 may be used to adjust any deviation of installation location of the optical disk drive 7, then fasten the fasten element 3 tightly to install the optical disk drive 7 securely in the interior of the casing 2.

Figure 7:
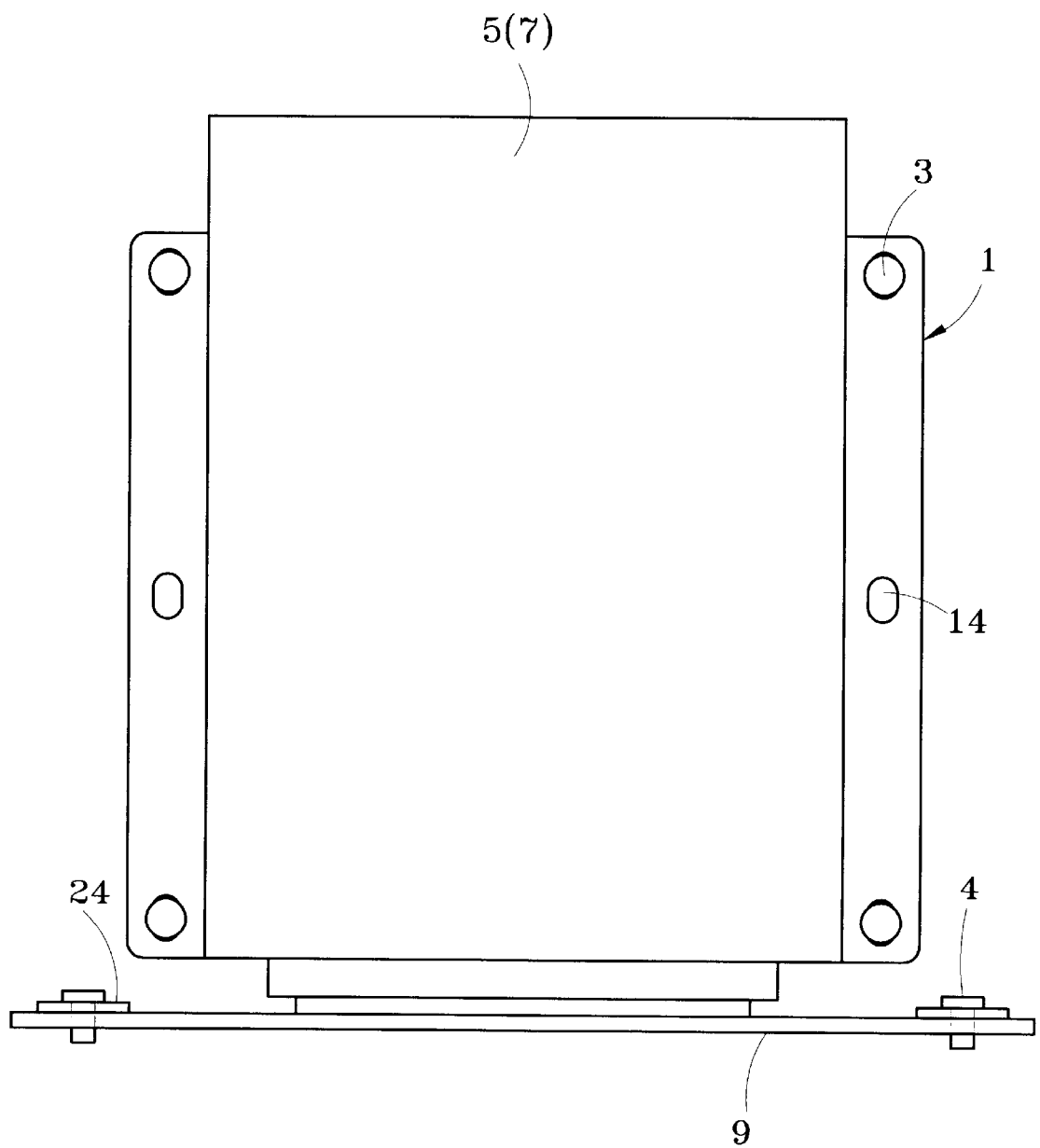
FIG. 7 is yet another schematic view of the invention in use.

Referring to FIG. 7 for another utilization of the invention, the connection plate 24 may be fastened to the casing 2 through a fasten element 4 for connecting a circuit board (interface circuit board) 9. After the floppy disk drive 5 or optical disk drive 7 is installed on the support section 21 of the casing 2, the contact legs of the floppy disk drive 5 or optical disk drive 7 may be connected to the circuit board (interface circuit board) 9 to drive the floppy disk drive 5 or optical disk drive 7, or to transmit data signals for the floppy disk drive 5 or optical disk drive 7.

In addition, the mounting structure 1 of the invention may be adapted for the floppy disk drive 5 or optical disk drive 7 of different specifications made by various producers. The mounting structure 1 may be fastened to the floppy disk drive 5 or optical disk drive 7 on the same or different directions (as shown in FIGS. 3, 4, 5 and 6) to mount the floppy disk drive 5 or optical disk drive 7 inside the casing 2.

What is claimed is:

1. An improved modularized component mounting structure for fastening components in the interior of a casing, comprising:

at least one mounting structure which has a bend section with two free ends extending to form a first fasten section and a second fasten section, the first fasten section having at least one fasten opening, the second fasten section having one pair of corresponding first coupling apertures and one pair of corresponding second coupling apertures located between the first coupling apertures;

a casing having a support section which has a surface with a plurality of jutting struts located thereof;

wherein the mounting structure is engageable with a component for fastening the component to the interior of the casing;

wherein the support section further has corresponding jutting connection plates located thereon, each of the connection plates having an aperture; and wherein the connection plates are selectively fastened to a circuit board or an interface circuit board.

2. The improved modularized component mounting structure of claim 1, wherein each of the jutting struts has internal screw threads formed therein.

3. The improved modularized component mounting structure of claim 1, wherein two sets of the mounting structure are provided to a fasten floppy disk drive or an optical disk drive in a same direction.

4. The improved modularized component mounting structure of claim 1, wherein two sets of the mounting structure are provided to fasten a floppy disk drive or an optical disk drive in different directions.

5. An improved modularized component mounting structure for fastening components in the interior of a casing, comprising:

at least one mounting structure which has a bend section with two free ends extending to form a first fasten section and a second fasten section, the first fasten section having at least one fasten opening, the second fasten section having one pair of corresponding first coupling apertures and one pair of corresponding second coupling apertures located between the first coupling apertures;

a casing having a support section which has a surface with a plurality of jutting struts located thereof;

wherein the mounting structure is engageable with a component for fastening the component to the interior of the casing; and wherein two sets of the mounting structure are provided to fasten a floppy disk drive or an optical disk drive in different directions.

6. The improved modularized component mounting structure of claim 5, wherein each of the jutting struts has internal screw threads formed therein.

7. The improved modularized component mounting structure of claim 5, wherein the support section further has corresponding jutting connection plates located thereon, each of the connection plates having an aperture.

8. The improved modularized component mounting structure of claim 7, wherein the connection plates are selectively fastened to a circuit board or an interface circuit board.

* * * * *